Dec. 26, 1950        R. RONCERAY        2,535,756
AIR LINE LUBRICATOR

Filed June 13, 1946        2 Sheets—Sheet 1

Inventor
Robert Ronceray
by Malcolm W. Fraser
attorney

Dec. 26, 1950     R. RONCERAY     2,535,756
AIR LINE LUBRICATOR

Filed June 13, 1946     2 Sheets-Sheet 2

Inventor
Robert Ronceray
by Malcolm W. Fraser
attorney

Patented Dec. 26, 1950

2,535,756

UNITED STATES PATENT OFFICE 2,535,756

AIR-LINE LUBRICATOR

Robert Ronceray, Thiais, France

Application June 13, 1946, Serial No. 676,448
In France March 5, 1943

Section 1, Public Law 690, August 8, 1946
Patent expires March 5, 1963

1 Claim. (Cl. 184—55)

The present invention relates to a method for the automatic lubrication of pneumatic machines, in which the very driving fluid, such for example as compressed air, is used as lubricant carrier. The invention further relates to an apparatus suitable for carrying out this method.

The problem of lubricating pneumatic machines has hitherto received but imperfect solutions.

It has been proposed to operate lubrication periodically, for example by means of burettes, hand-operated pumps, etc., but this way of doing calls for excessive quantities of lubricant without any appreciable advantage for the operated machines. Indeed, first penetrations of air into the assembly cause the greater part of lubricant to be expelled outwards, so that a further operation takes place in the presence of an insufficient quantity of lubricant decreasing on steadily.

It has further been proposed to operate a continuous lubrication by means of what may be termed as greasy compressed air, but this way of doing calls for the expenditure of an important quantity of lubricant due to exhaust losses and other leakages. Besides, there is always a danger of the lubricant passing entirely into fluid carrying pipes should the lubricating apparatus be not closed up during stoppages.

It is an object of the present invention to provide a method for lubricating pneumatic machines, which should obviate the inconveniences inherent to the proposals just referred to.

It is a further object of the present invention to provide a method of lubricating pneumatic machines, which is discontinuous and permits lubricant to be distributed in proportion to the work being done by the pneumatic machine under consideration.

It is yet a further object of the present invention to provide an apparatus suitable for carrying out the above methods and adapted to be connected with the circuit of compressed fluid feeding the pneumatic machine under consideration.

According to one feature of the present invention there is provided a method of lubricating pneumatic machines, which consists in atomizing, in the beginning of each operation of the pneumatic machine under consideration, a small adjustable quantity of lubricant into the fluid driving the said machine, such atomization being carried out preferably by making use of the pressure drop which is produced in the fluid piping when the pneumatic machine is set in operation.

According to a further feature of the present invention there is provided an apparatus for lubricating pneumatic machines, which is essentially composed of a tight lubricant-container adapted to be connected with the compressed fluid piping and provided with suitable admission means and exhaust means; these two means are controllable by suitable valves and, preferably, may open into the connection piping.

Desirably, admission valve pressure may be adjustable.

Further objects and features of the present invention will be apparent from the following description and appended claim.

The invention will be described with reference to the accompanying drawings in which.

Figure 1:
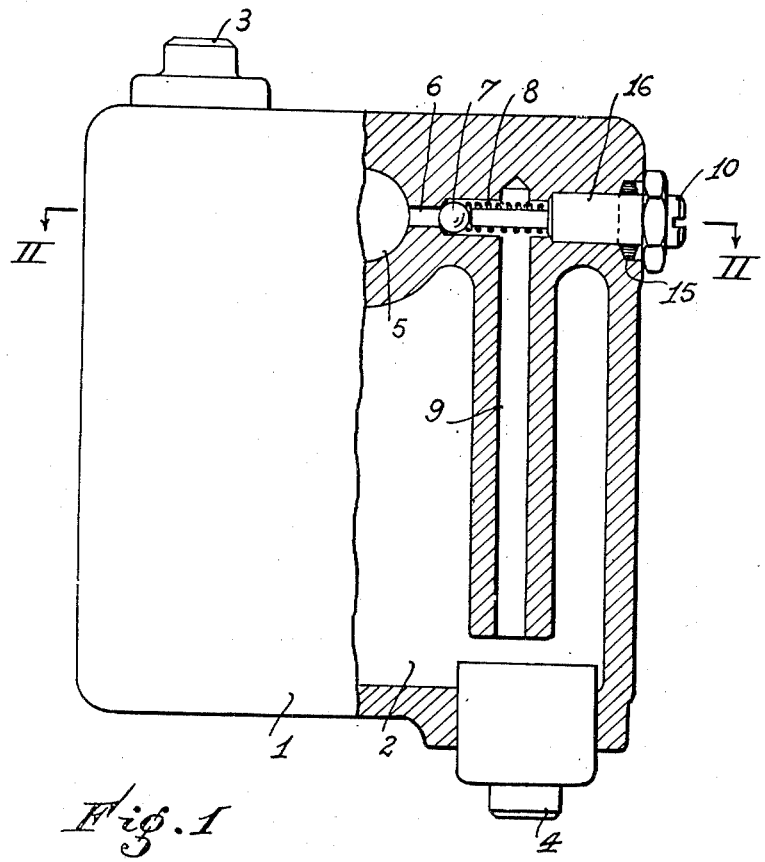
Fig. 1 is an elevational view, partly in section through the line I—I of Fig. 2, showing one form of apparatus for lubricating pneumatic machines, designed according to the present invention.
Figure 2:
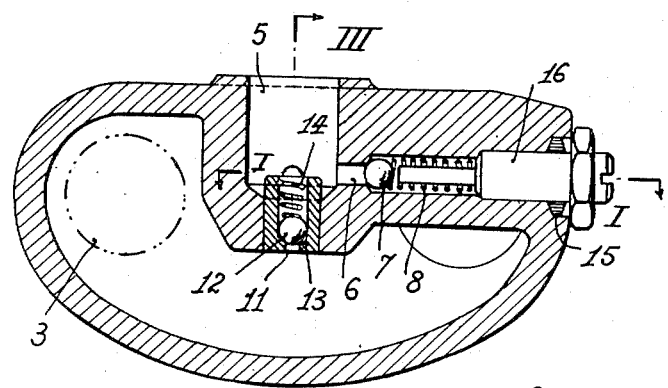
Fig. 2 is a horizontal sectional view taken through the line II—II of Fig. 1.
Figure 3:
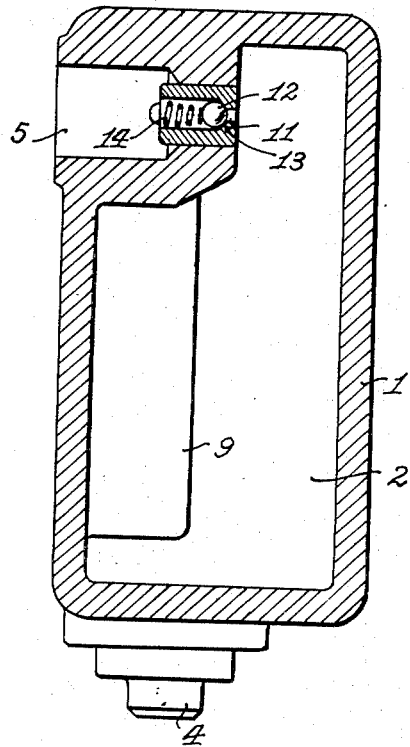
Fig. 3 is a vertical sectional view taken through the line III—III of Fig. 2.

The lubricating apparatus according to the present invention comprises a lubricant container 1 including an inner space 2 and having a filling plug 3 and an emptying plug 4. The inner wall of the container 1 carries, at its upper end, a protrusion wherein is managed a bore 5 which may be threaded and by means of which the apparatus may be connected with the compressed fluid piping.

Into the bore 5 opens the admission channel 6 which may be closed up by a valve ball 7 pressed against its seat by a spring 8. The admission channel 6 may communicate with a vertical conduit 9 which extends deep into the inner space 2. Pressure exerted by the spring 8 against the ball 7, hence the force causing the ball 7 to apply against its seat, may be adjusted by screwing up or down an adjustment screw 10 adapted to act upon the adjacent end of the said spring 8. Desirably, a tight joint 15 is provided between the barrel 16 of screw 10 and the apparatus body 1. Into the same bore 5 opens the exhaust outlet 11 which may be obstructed by a valve ball 12 pressed against its seat by means of a spring 14.

The operation of the lubricating apparatus just described is as follows:

The apparatus being connected to the compressed air feed-pipe-line, for example by means of a threaded T-like pipe fitting mounted on this pipe-line, the inner space 2 thereof is filled with a desired lubricant through the filling plug 3. Supposing that the machine operated by the fluid under pressure is in operation, there is formed in the pipe-line a pressure which, under the action of the exhaust valve 12, is equal to that formed within the lubricating apparatus. When the machine stops to operate, the pressure existing in the pipe-line increases so as to become equal to the compressor pressure. At this instant, the admission valve 7 opens against the action of the spring 8, wherefore a certain quantity of compressed fluid is allowed to penetrate through the conduit 9 into the lubricating apparatus where it bubbles in a layer of lubricant until the pressure in this apparatus becomes equal to that in the pipe-line. Meanwhile, the bubbling fluid is loaded with fine particles of lubricant.

When the machine is subsequently set in operation, a drop of pressure is produced in the pipe-line with respect to which the lubricating apparatus is then under overpressure, wherefore the valve ball 12 is caused to move against the action of the spring 14 and a certain quantity of air loaded with fine particles of lubricant is thereby allowed to penetrate into the pipe-line until the pressure in the lubricating apparatus becomes equal to that in the pipe-line. Any further discharge of the fluid under pressure loaded with lubricant is then stopped until the machine will have been set again in operation.

By regulating the pressure exerted by the spring 8 on the ball 7, it is possible to determine the momentary magnitude of pressure under which the compressed fluid is allowed to penetrate into the lubricating apparatus; it is therefore possible thereby to regulate the quantity of fluid allowed to penetrate into the lubricating apparatus and to be loaded with particles of lubricant, hence the quantity of lubricating agent allowed to be spent each time the machine is set in operation.

From the preceding description it is apparent that the lubricating apparatus designed according to the present invention has the following advantages:

First of all, the lubrication is entirely automatic and needs no attendance, except for a verification of the quantity of lubricant available in the inner space 2. Furthermore, only a very small quantity of lubricant is used at each operation, and the lubricating apparatus can operate only when the machine driven by the fluid under pressure is set in operation, so that with the lubricating apparatus according to the present invention the best possible use can be made of the lubricant employed. By adjusting the spring 8, it is possible to introduce, at each setting in operation, a quantity of lubricant just sufficient for maintaining films of lubricant on mechanical parts subject to lubrication. The adjustment of the spring 8 is preferably effected by decreasing its pressure until the instant the exhaust outlets become greasy, without excess of lubricant deposited thereon, wherefore there is a certainty that the lubricant is discharged in sufficient quantity by the lubricating apparatus and is entirely used up by the machine. Finally, the lubricating apparatus of the present invention is distinguishable by the simplicity of its construction, which permits a lasting operation thereof and excludes any danger of breaking down, and by the facility with which this apparatus may be mounted on any desired compressed fluid pipe-line.

Advantageous as it is in particular to cause the admission channel and exhaust channel to open into one and the same bore 5, it is obvious that, for any desired reasons, the lubricating apparatus of the present invention may be provided with an admission channel and exhaust channel separated from the said bore. Also, the ball-valves hereinabove described may be replaced by any other suitable fluid flow control-means. Finally, there may be modified at will the shape of the apparatus described and the mutual disposition of various parts in the embodiment illustrated.

The invention having thus been described and its use illustrated, what is claimed as new and desired to be secured by Letters Patent is:

An airline lubricator comprising a lubricant container, a valve housing in the upper portion of the container, a lateral passage in said housing opening at one end directly to the outside for connection to an airline, said lateral passage communicating at its other end directly with the inside of the container, a spring-tensioned valve normally preventing the flow of fluid from said container through said lateral passage, a horizontal passage extending directly from said lateral passage to the outside, a vertical passage extending from said horizontal passage to the inside of the container and terminating near the bottom thereof, a valve in said horizontal passage in the region between the inner side of said vertical passage and said lateral passage, a spring urging said last valve seated for normally closing said horizontal passage against fluid from said lateral passage, and means on the outer side of said vertical passage for closing the outer end of said horizontal passage and including spring adjusting means accessible from the outside of the container.

ROBERT RONCERAY.

REFERENCES CITED

The following references are of record in the file of this patent:

UNITED STATES PATENTS

| Number | Name | Date |
|---|---|---|
| 1,045,462 | Turner | Nov. 26, 1912 |
| 1,721,231 | Osborne | July 16, 1929 |
| 2,223,700 | Norgren | Dec. 3, 1940 |

FOREIGN PATENTS

| Number | Country | Date |
|---|---|---|
| 895,965 | France | 1944 |